(12) United States Patent
Chen

(10) Patent No.: US 6,560,691 B2
(45) Date of Patent: May 6, 2003

(54) MODULUS ADDRESS GENERATOR AND METHOD FOR DETERMINING A MODULUS ADDRESS

(75) Inventor: Ching-Chia Chen, Tien-Chung Chen (TW)

(73) Assignee: Faraday Technology Corp., Hsinchu (TW)

( * ) Notice: Subject to any disclaimer, the term of this patent is extended or adjusted under 35 U.S.C. 154(b) by 128 days.

(21) Appl. No.: 09/878,879

(22) Filed: Jun. 11, 2001

(65) Prior Publication Data

US 2002/0156990 A1 Oct. 24, 2002

(30) Foreign Application Priority Data

Apr. 19, 2001 (TW) ........................................ 90109369 A

(51) Int. Cl.[7] .......................... G06F 12/00; G06F 12/06; G06F 12/08
(52) U.S. Cl. ........................ 711/219; 711/220; 711/109
(58) Field of Search ................................. 711/219, 220, 711/217, 110, 109; 365/78, 80, 230.01, 189.12

(56) References Cited

U.S. PATENT DOCUMENTS

| | | | | |
|---|---|---|---|---|
| 4,800,524 A | * | 1/1989 | Roesgen | 711/217 |
| 5,623,621 A | * | 4/1997 | Garde | 711/220 |
| 5,659,700 A | * | 8/1997 | Chen et al. | 711/217 |
| 5,918,252 A | * | 6/1999 | Chen et al. | 711/217 |
| 5,983,333 A | * | 11/1999 | Kolagotla et al. | 711/219 |

* cited by examiner

Primary Examiner—Do Hyun Yoo
Assistant Examiner—Kathy Takeguchi
(74) Attorney, Agent, or Firm—J.C. Patents

(57) ABSTRACT

A modulus address generator calculates the next address to access from a current address of a circular buffer having a length L and an address shift from the current address to the next address to access. Within the circuit of the modulus address generator, a plurality of registers stores the length L of the circular buffer, the current address, and the address shift. A separator circuit generates an offset address and a base address from a mask value and the current address. A modulus calculation via a plurality of adders, and selectors is performed to calculate the next address of the circular buffer to access. A sign selector associated with an inverter and the separator circuit sets a wrap around flag depending on whether a wrap around the circular buffer has occurred during the modulus calculation of the next address to access.

6 Claims, 4 Drawing Sheets

MODULUS ADDRESS GENERATOR AND METHOD FOR DETERMINING A MODULUS ADDRESS

CROSS-REFERENCE TO RELATED APPLICATION

This application claims the priority benefit of Taiwan application serial no. 90109369, filed Apr. 19, 2001.

BACKGROUND OF THE INVENTION

1. Field of the Invention

The present invention relates to a circuit for calculating the address of a memory. More particularly, the present invention relates to a modulus address generator circuit for a circular buffer and a method for determining the modulus address of a circular buffer in a memory.

2. Description of the Related Art

Referring to FIG. 1, a diagram schematically illustrates a conventional addressing of a circular buffer of a memory. In a memory 104, a memory space with a length L is dedicated to a circular buffer 102 which has a first address at the address N of the memory 104. An A register is used as a pointer of the current address A in the circular buffer 102, as shown by the arrow 106.

In FIG. 1, the A register stores a current address A that corresponds to, for example, the address (N+L−3) of the memory 104. If the next current address to access is shifted from the current address by, for example, an address shift (+6), the next current address of the circular buffer thus is calculated by [(L−3)+6] modulo (L)=N+3.

Referring to FIG. 2, a block diagram schematically illustrates a conventional modulus address generator that implements the above-described modulus addressing. The conventional modulus address generator 200 comprises an A register 202 that stores the current address within the circular buffer, a M register 204 that stores the address shift M from the current address to the next address, and a L register 206 that stores the length L of the circular buffer.

Within the conventional modulus address generator 200, a first adder 208 adds the current address A to the address shift M to obtain an absolute address ABS_ADDR. A second adder 210 adds either the length L or the opposite of the length (−L) to the absolute address ABS_ADDR to obtain a wrapped address WRAP_ADDR. The addition of either the length L or the opposite of the length (−L) to the absolute address ABS_ADDR is determined depending on the sign bit of the address shift M. If the sign bit of the address shift M is "0", an addition of the opposite of the length (−L) to the absolute address ABS_ADDR is performed. If the sign bit of the address shift M is "1", an addition of the length L to the absolute address ABS_ADDR is performed.

Then, depending on a wrap around flag WRAP, a selector 212 determines whether the wrapped address WRAP_ADDR or the absolute address ABS_ADDR is output to an A register 202 as the next current address of the circular buffer to access. The wrap around flag WRAP is conventionally set via a determination circuit that comprises a priority encoder 224, selectors 216 and 218, an OR gate 220, an inverter 222 and a selector 214. If the result of the addition of the current address A to the address shift M is beyond the circular buffer, the wrap around flag is set to "1", if it is within the circular buffer, the wrap around flag thus is set to "0".

The setting of the wrap around flag of the above-described conventional circuit is achieved by a complicated determination circuit and one may desire a simpler circuit to implement the modulus addressing.

SUMMARY OF THE INVENTION

One major aspect of the present invention is to provide a modulus address generator in which the setting of the wrap around flag is performed via a simple circuit.

To attain the foregoing and other objectives, the modulus address generator, according to a preferred embodiment of the present invention, comprises: a first register that stores the current address of the circular buffer; a second register that stores the length of the circular buffer; a third register that stores the address shift from the current address to the next address to access; a priority encoder that is connected to the second register and generates a mask value from an index table that establishes a correspondence between the length of the circular buffer and the mask value; a separator circuit that is connected to the priority encoder and the first register, the separator circuit calculating an offset address and a base address from the mask value and the first address of the circular buffer; a first adder that is connected to the separator circuit and the third register to calculate an absolute offset address from the offset address and the address shift; a complementary operator that is connected to the second register to perform a complementary operation applied to the length of the circular buffer; a length selector that is connected to the complementary operator, the second register, and the third register to select either the length of the circular buffer or the complementary length of the circular buffer delivered by the complementary operator; a second adder that is connected to the length selector and the first adder to calculate a wrapped offset address from the absolute offset address calculated by the first adder and the length selected by the length selector; a first logical gate that is connected to the second adder to invert a sign bit of the wrapped offset address; a sign selector that is connected to the third register, the first logical gate, and the first adder, the sign selector selecting either the sign bit of the absolute offset address or the inverted sign bit of the wrapped offset address, depending on the sign bit of the address shift, to generate a wrap-around flag; an address selector that is connected to the first adder, the second adder, and the sign selector, the address selector outputting an offset second address according to the wrap-around flag; and a second logical gate that is connected to the address selector and the separator circuit to calculate the next address of the circular buffer to access from an OR boolean operation applied to the offset second address and the base address.

To attain the foregoing and other objectives, the present invention provides a method that determines a modulus address of a circular buffer. First, an index table that establishes a correspondence between the length of the circular buffer and a plurality of mask values is provided. A mask value in the index table corresponding to the effective length of the circular buffer then is selected. An offset address and a base address are calculated from the mask value and a current address of the circular buffer. An absolute offset address is calculated by adding the offset address to an address shift from the current address to the next address to access. A complementary operation applied to the length of the circular buffer then is performed to obtain a complementary length of the circular buffer. Either the length of the circular buffer or the complementary length of the circular buffer then is selected depending on the sign bit of the address shift to obtain a selected length. A wrapped offset address is calculated from the addition of the absolute offset address to the selected length. The sign bit of the wrapped offset address is inverted. Either the sign bit of the absolute offset address or the inverted sign bit of the wrapped offset address is selected depending on the sign bit of the address shift to generate a wrap-around flag. Either the absolute offset address or the wrapped offset address is selected depending on the wrap-around flag as an offset second address. The next address of the circular buffer to access finally is calculated from an OR boolean operation applied to the offset second address and the base address.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The following detailed description of the embodiments and examples of the present invention with reference to the accompanying drawings is only illustrative and not limiting.

Figure 1:
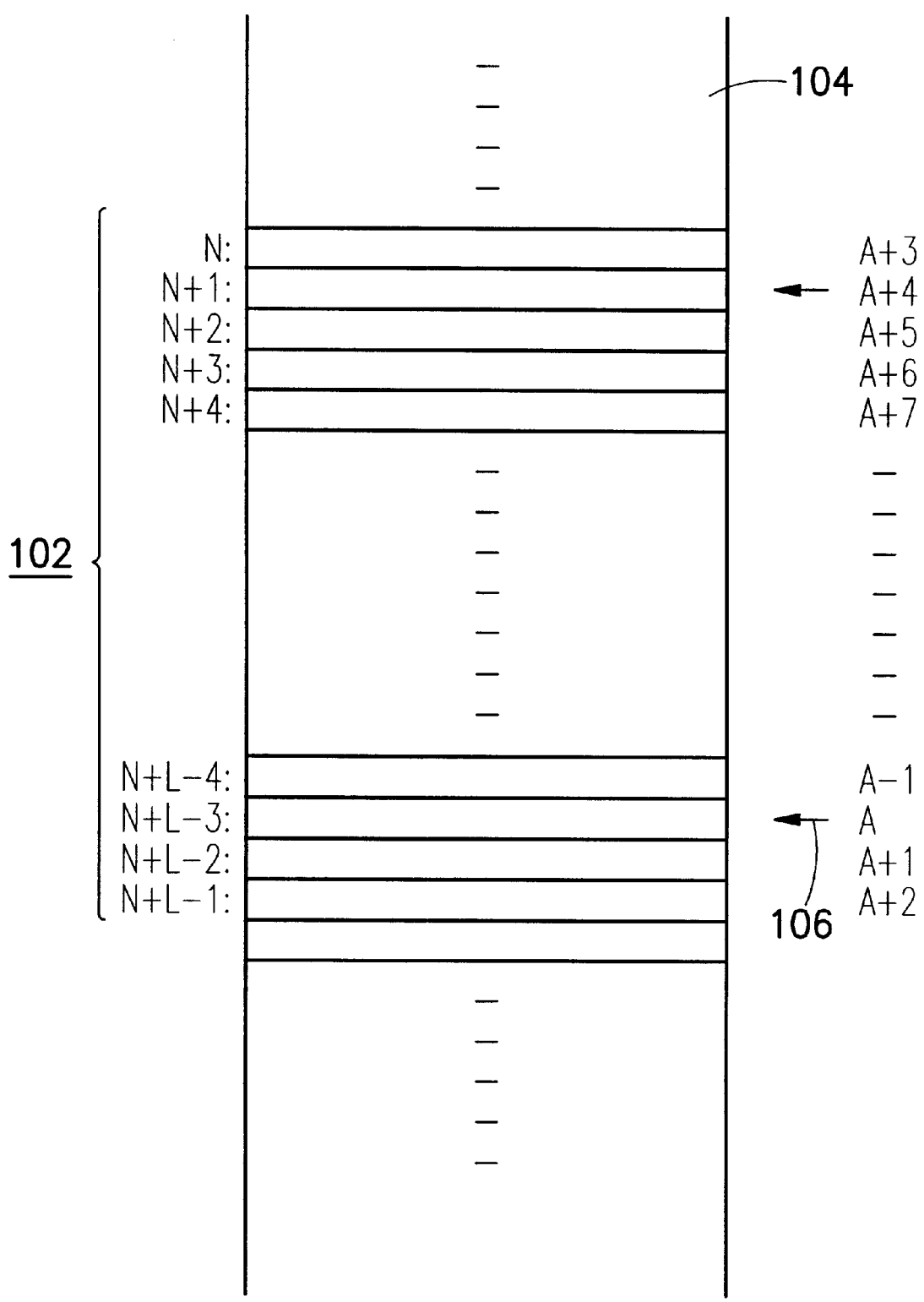
FIG. 1 is a diagram schematically illustrating a conventional modulus addressing.
Figure 2:
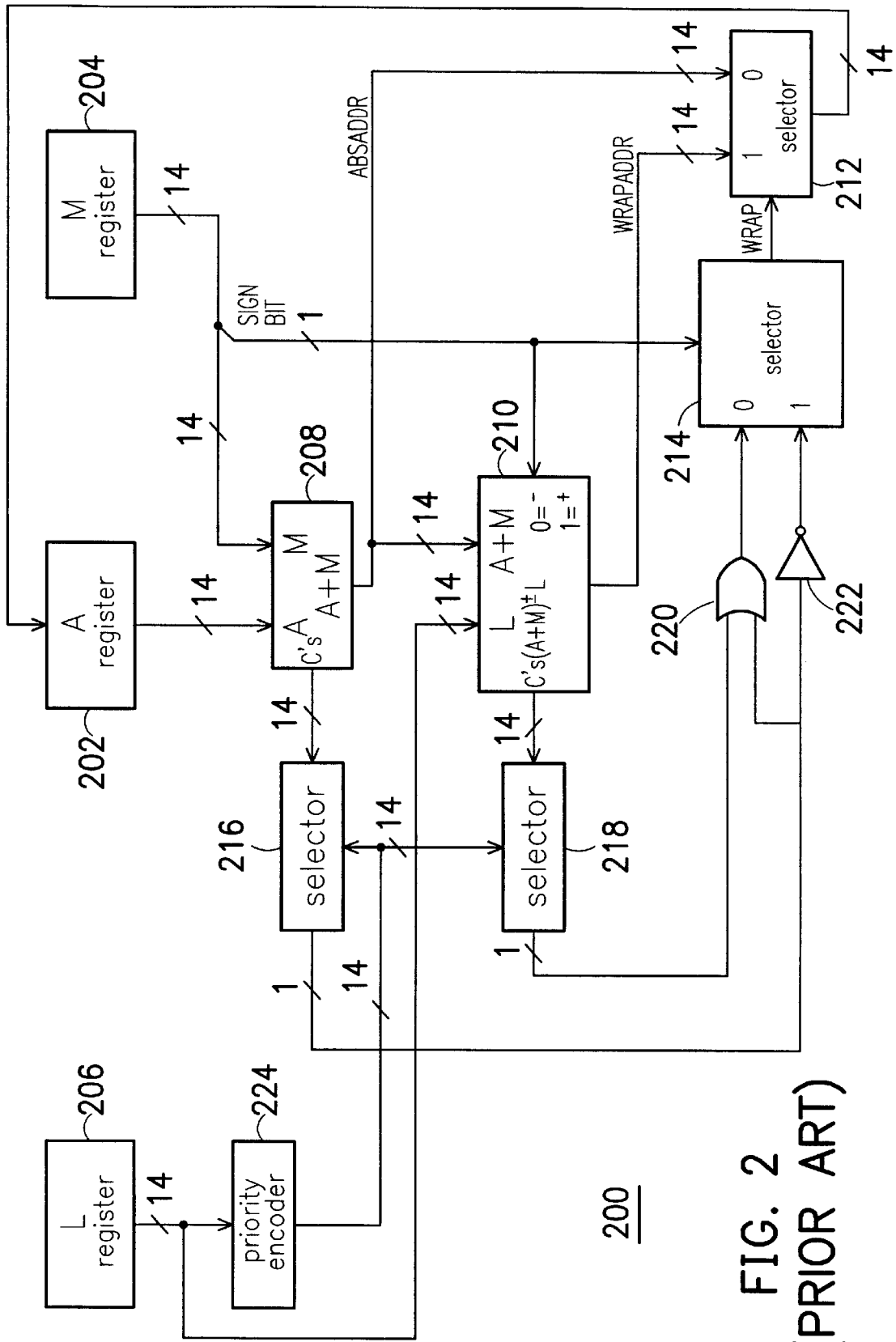
FIG. 2 is a block diagram schematically illustrating a conventional modulus address generator.
Figure 3:
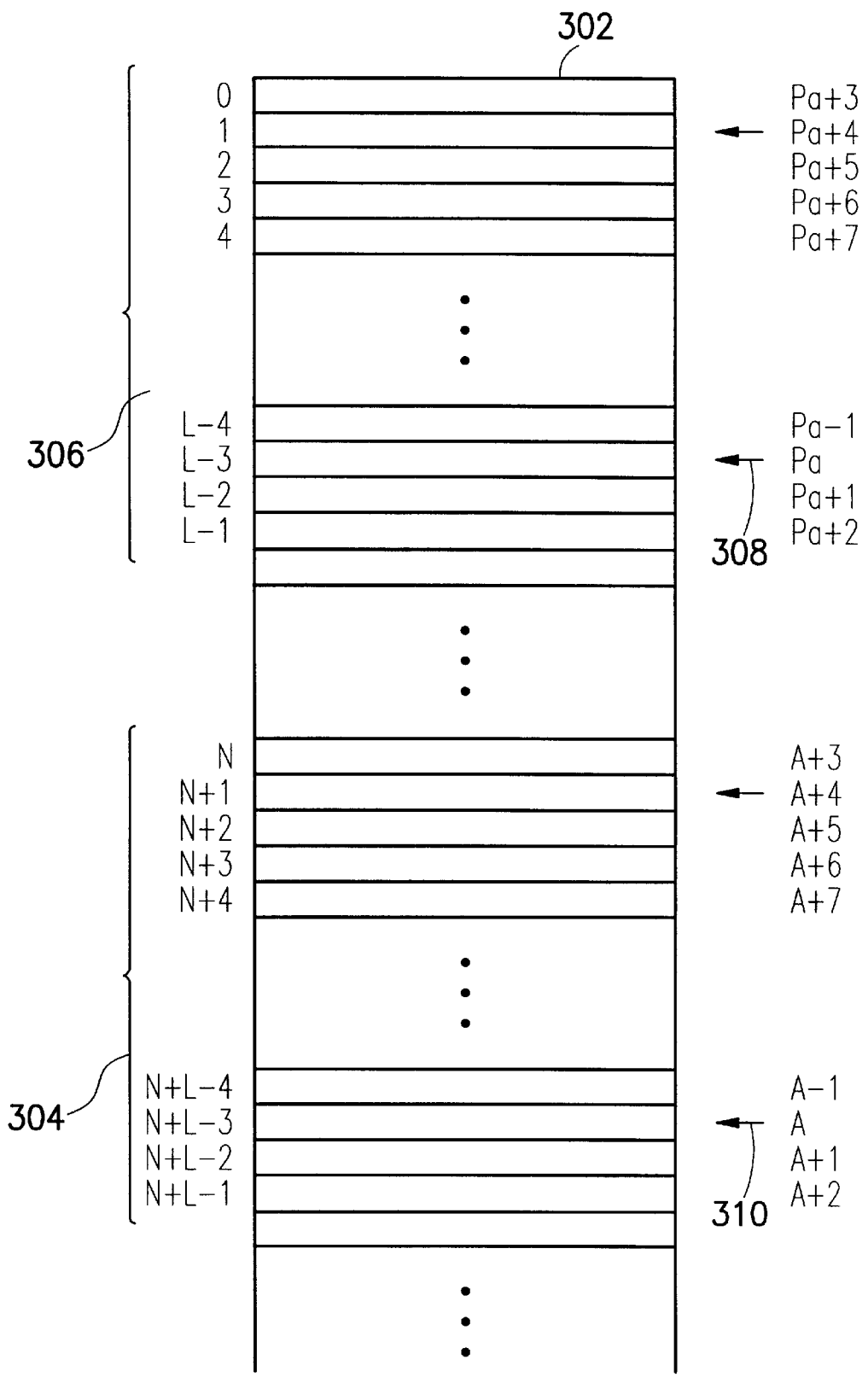
FIG. 3 is a diagram schematically illustrating a modulus addressing according to a preferred embodiment of the present invention.

Referring to FIG. 3, a diagram schematically illustrates a modulus addressing according to a preferred embodiment of the present invention. In a memory 302, a space is assigned to a circular buffer 304. In the example of FIG. 3, the circular buffer 304 has a length of L words (or bytes) and for example starts at the address N (also called base address in the present description) of the memory 302. Reference numeral 306 indicates another "virtual" circular buffer that only illustrates the method of calculation of the modulus address used in the present invention and described hereafter. The length of this virtual circular buffer is identical to that of the circular buffer 304.

Deducting all the addresses of the circular buffer 304 from the base address N is equivalent to an offset of the circular buffer 304 to the top of the memory 302 into the "virtual" circular buffer 306. If an A register (not shown) within the circular buffer 304 points to a current address A that is, for example, the address (N+L−3) shown by arrow 310, after deduction of the base address N, the obtained address is (L−3) (current address Pa of the "virtual" circular buffer 306 shown by the arrow 308). Then, if the next address to access is, for example, (+1) address further from the current address, the current address within the "virtual" circular buffer 306 would add 1. A "virtual" pointing register (not shown) thus would point to a next address that would be the address (L−2). In contrast, if the next address to access is (+6) addresses further from the current address, the current address thus would add 6. However, because the pointing register would indicate an address that would be out of the virtual circular buffer 306 when added 6, thus the effective address would be calculated by [(L−3)+6] modulo (L)=3.

Thus, when the "virtual" pointing register attains the last address of the "virtual" circular buffer 306, the address (L−1), the pointing register keeps counting while returning to the first address of the "virtual" circular buffer 306, which is the address 0 of the memory 302 in the present example. A wrap-around flag is set when this wrap around occurs. Then, the address obtained within the "virtual" circular buffer 306 adds the base address N to obtain the effective next address to access within the circular buffer 304.

Figure 4:
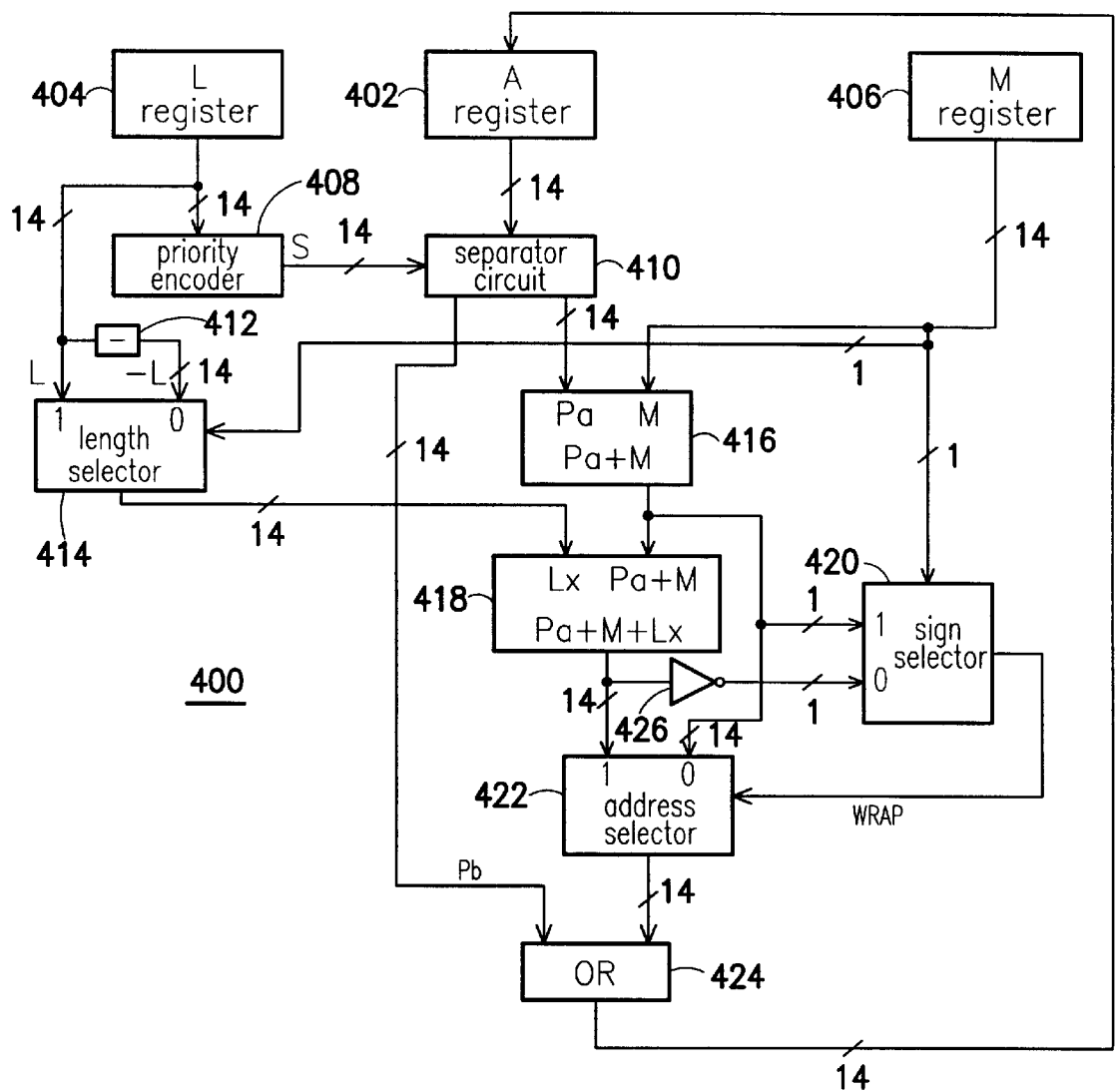
FIG. 4 is a block diagram schematically illustrating a modulus address generator according to a preferred embodiment of the present invention.

Referring to FIG. 4, a block diagram schematically shows a modulus address generator that implements the above-described modulus addressing method, according to a preferred embodiment of the present invention. The circuit of FIG. 4 is only a possible implementation of the present invention, and other modifications apparent to those skilled in the art are possible within the spirit of the present invention. The modulus address generator 400 of the present invention comprises an A register 402, a L register 404, and a M register 406. The A register 402 registers the current address A of the circular buffer. The L register 404 stores the length L of the circular buffer. The M register 406 stores the address shift M from the current address A to the next address of the circular buffer to access, wherein the value M can be positive or negative.

According to the calculation of a circular modulus addressing, the next address to access is (A+M−B) modulo (L)+B, wherein B is the base address equal to $2^n$ or a multiple of $2^n$, n satisfying the condition $2^{n-1}<L\leq 2^n$. The base address B thus practically depends on the length of the circular buffer, and the current address A is located between the base address B and the address (B+L) addition of the base address to the length of the circular buffer.

The modulus address generator of FIG. 4 performs four principal functions:

(1) decomposing the current address A into a base address Pb (i.e. B) and an offset address Pa;
(2) generating an absolute offset address (Pa+M) and a wrapped offset address (Pa+M±L);
(3) setting a wrap-around flag;
(4) depending on the wrap-around flag, adding either the offset address or the wrapped offset address to the base address to obtain the next address to access.

Referring to FIG. 4, a priority encoder 408 receives the length L of the circular buffer, exemplary coded by 14 bits in the present embodiment (all the values stored by the other registers are also coded by 14 bits). The priority encoder 408, from the highest bit which represents 1 in the fourteen bits of the length L, generates a mask value S. The correspondence between the mask value S and the length L is stored in an index table as follows:

L=00 0000 0000 0000 then S=00 0000 0000 0000;
L=00 0000 0000 0001 then S=00 0000 0000 0001;
L=00 0000 0000 0010 then S=00 0000 0000 0001;
L=00 0000 0000 0011 then S=00 0000 0000 0011;
L=00 0000 0000 0100 then S=00 0000 0000 0011;
L=00 0000 0000 01?? then S=00 0000 0000 0111;
L=00 0000 0000 1000 then S=00 0000 0000 0111;
L=00 0000 0000 1??? then S=00 0000 0000 1111;
L=00 0000 0001 0000 then S=00 0000 0000 1111;
L=00 0000 0001???? then S=00 0000 0001 1111;
L=00 0000 0010 0000 then S=00 0000 0001 1111;

L=00 0000 001? ???? then S=00 0000 0011 1111;
L=10 0000 0000 0000 then S=01 1111 1111 1111;
L=1? ???? ???? ???? then S=11 1111 1111 1111;
wherein all the bits written with the mark"?" at the same time cannot be all equal to "0", for example if L=00 0000 0000 1001, then S=00 0000 0000 1111.

When receiving the mask value S and the current address A, a separator circuit 410 performs an AND boolean operation applied to S and A via an AND gate to obtain the offset address value Pa. The separator circuit 410 also performs an AND boolean operation applied to the current address A and the inverse of S to obtain the base address Pb. Both the priority encoder 408 and the separator circuit 410 thus process the current address A by decomposing it into the offset address Pa and the base address Pb as A=Pa+Pb.

A first adder 416 then adds the offset address Pa to the address shift M stored in the M register to obtain an absolute offset address (Pa+M). A complementary operator 412 then is applied to the length L to obtain the opposite length value (−L). The length L and complementary length (−L) are respectively input to the inputs 1 and 0 of the length selector 414. Depending on the sign bit of the address shift M, the length selector 414 then determines whether outputting the length L or (−L) as a selected length Lx. In the present embodiment, if the address shift M stored in the M register is negative, the sign bit is "1", for example, and the selected length Lx output by the length selector 414 thus is the length L. On the contrary, if the sign bit of the address shift M is "0", the selected length Lx output by the length selector 414 is the complementary length (−L).

A second adder 418 then adds the absolute offset address (Pa+M) to the selected length Lx to obtain a wrapped offset address (Pa+M+Lx). As described above, if the sign bit of the address shift M is "1", the wrapped offset address is (Pa+M−L) while if the bit sign of the address shift M is "1", the wrapped offset address is (Pa+M+L).

When the address shift M is negative, a wrap around the circular buffer would be represented by the sign bit of the absolute offset address (Pa+M), calculated by the first adder 416, which would be "1" because an underflow during the addition operation would have occurred. If a wrap around the circular buffer does not occur, the sign bit of the absolute offset address (Pa+M) would be "0" because the underflow would not have occurred during the addition operation.

When the address shift M is positive, a wrap around the circular buffer would be represented by the sign bit of the wrapped offset address (Pa+M−L), calculated by the second adder 418, which would be "0" because the underflow would not have occurred during the addition. If a wrap around the circular buffer does not occur, the sign bit of the wrapped offset address (Pa+M−L) would be "1" because an underflow would have occurred during the addition operation.

The sign bit of the absolute offset address (Pa+M), and the sign bit of the wrapped offset address (Pa+M+Lx) first via an inverter 426 then are both respectively delivered to the inputs 1 and 0 of a sign selector 420. Depending on the sign bit of the address shift M, the sign selector 420 determines whether either the sign bit of the absolute offset address (Pa+M) or the inverse of the sign bit of the wrapped offset address (Pa+M+Lx) is assigned to a wrap-around flag WRAP.

Both the wrapped offset address (Pa+M+Lx) and the absolute offset address (Pa+M) are respectively input to the inputs 1 and 0 of an address selector 422. Depending on the wrap-around flag WRAP output by the sign selector 420, the address selector 422 determines whether either the wrapped offset address (Pa+M+Lx) or the absolute offset address (Pa+M) is output.

The output of the address selector 422, which can be either the wrapped offset address (Pa+M+Lx) or the absolute offset address (Pa+M), and the base address Pb from the separator circuit 410 then are input to an OR gate 424 to obtain the next current address to access within the circular buffer. The next current address output by the OR gate then is delivered to the A register 402. A cycle of the address selection within the circular buffer thus is achieved.

The operation of the modulus address generator of the present invention such as described above will be better understood with the following illustrated example.

Let's assume that:
In the L register: L=00 0101 0010 0000;
In the A register: A=00 1110 0000 0000;
In the M register: M=00 0101 0000 0000.

Then, the mask value is: S=11 1000 0000 0000; the separator circuit determines the base address Pb and the offset address Pa:

Pb=S AND A
Pb=11 1000 0000 0000 AND 00 1110 0000 0000
Pb=00 1000 0000 0000;
Pa=(INV S) AND A
Pa=00 0111 1111 1111 AND 00 1110 0000 0000
Pa=00 0110 0000 0000.

The first and second adders determine the absolute offset address and the wrapped offset address:

Absolute offset address Pa+M=00 1011 0000 0000;
Wrapped offset address Pa+M−L =00 0110 1110 0000.

Because the sign bit of the address shift M is "0", the sign bit of the wrapped offset address (Pa+M−L) is "0", so the wrap-around flag WRAP is equal to "1". The next current address of the memory finally is calculated:

A=(Pa+M−L) OR Pb=00 1110 1110 0000.

In conclusion, with the above-described method and circuit structure, the determination of the wrap-around flag can be simply determined via an inverter and a sign selector such that the circuit structure of the modulus address generator advantageously is simplified.

It will be apparent to those skilled in the art that various modifications and variations can be made to the structure of the present invention without departing from the scope or spirit of the invention.

What is claimed is:

1. A modulus address generator circuit that calculates the next address to access from a current address and an address shift within a circular buffer having a given length, the modulus address generator circuit comprising:

a first register that stores the value of the current address of the circular buffer;

a second register that stores the value of the length of the circular buffer;

a third register that stores the value of the address shift;

a priority encoder that is connected to the second register and generates a mask value from an index table that establishes a correspondence between the value of the length of the circular buffer and the mask value;

a separator circuit that is connected to the priority encoder and the first register, the separator circuit calculating the value of an offset address and the value of a base address from the mask value and the value of the current address;

a first adder that is connected to the separator circuit and the third register to calculate the value of an absolute offset address from the value of the offset address and the value of the address shift;

a complementary operator that is connected to the second register to perform a complementary operation applied to the value of the length of the circular buffer;

a length selector that is connected to the complementary operator, the second register, and the third register to select either the value of the length of the circular buffer or the value of the complementary length of the circular buffer delivered by the complementary operator;

a second adder that is connected to the length selector and the first adder to calculate the value of a wrapped offset address from the value of the absolute offset address calculated by the first adder and the value of the length selected by the length selector;

a first logical gate that is connected to the second adder to invert a sign bit of the value of the wrapped offset address;

a sign selector that is connected to the third register, the first logical gate, and the first adder, the sign selector selecting either the value of the sign bit of the absolute offset address or the value of the inverted sign bit of the wrapped offset address, depending on the value of the sign bit of the address shift, to generate a wrap-around flag;

an address selector that is connected to the first adder, the second adder, and the sign selector, the address selector outputting the value of an offset second address according to the value of the wrap-around flag; and a second logical gate that is connected to the address selector and the separator circuit to calculate the value of the next address to access within the circular buffer from an OR boolean operation applied to the value of the offset second address and the value of the base address.

2. The modulus address generator circuit of claim 1, wherein the first logical gate is an inverter.

3. The modulus address generator circuit of claim 1, wherein the second logical gate is a OR gate.

4. A method for determining the next address to access from an address shift and a current address within a circular buffer with a given length, the method comprising:

providing an index table that establishes a correspondence between the value of the length of the circular buffer and a plurality of mask values;

selecting a mask value in the index table corresponding to the value of the given length of the circular buffer;

calculating the value of an offset address and the value of a base address from the mask value and the value of the current address;

calculating the value of an absolute offset address from the addition of the value of the offset address to the value of the address shift;

performing a complementary operation applied to the value of the length of the circular buffer to obtain the value of a complementary length of the circular buffer;

selecting either the value of the length of the circular buffer or the value of the complementary length of the circular buffer, depending on the value of the sign bit of the address shift, to obtain the value of a selected length;

calculating the value of a wrapped offset address from the addition of the value of the absolute offset address to the value of the selected length;

inverting the sign bit of the value of the wrapped offset address;

selecting either the value of the sign bit of the absolute offset address or the value of the inverted sign bit of the wrapped offset address, depending on the value of the sign bit of the address shift, to generate a wrap-around flag;

selecting either the value of the absolute offset address or the value of the wrapped offset address, depending on the value of the wrap-around flag, as the value of an offset second address; and calculating the value of the next address to access within the circular buffer from an OR boolean operation applied to the value of the offset second address and the value of the base address.

5. The method of claim 4, wherein the step of calculating the value of the offset address from the mask value and the value of the current address of the circular buffer comprises:

inverting the mask value; and performing an AND boolean operation applied to the value of the inverted mask value and the value of the current address.

6. The method of claim 4, wherein the step of calculating the value of the base address from the mask value and the value of the current address is carried out by performing a AND boolean operation applied to the mask value and the value of the current address.

* * * * *